(12) United States Patent
Folkmar

(10) Patent No.: US 8,870,040 B2
(45) Date of Patent: Oct. 28, 2014

(54) TWO PART NOZZLE AND PIPING BAGS THEREFROM

(75) Inventor: Jan Folkmar, Weggis (CH)

(73) Assignee: Jan Folkmar, Weggis (CH)

( * ) Notice: Subject to any disclaimer, the term of this patent is extended or adjusted under 35 U.S.C. 154(b) by 0 days.

(21) Appl. No.: 13/255,818

(22) PCT Filed: Mar. 13, 2009

(86) PCT No.: PCT/EP2009/001811
§ 371 (c)(1),
(2), (4) Date: Sep. 9, 2011

(87) PCT Pub. No.: WO2010/102648
PCT Pub. Date: Sep. 16, 2010

(65) Prior Publication Data
US 2012/0006849 A1 Jan. 12, 2012

(51) Int. Cl.
*A23G 3/28* (2006.01)
*A21C 15/00* (2006.01)

(52) U.S. Cl.
CPC ............... *A23G 3/28* (2013.01); *A21C 15/005* (2013.01)
USPC ........................... 222/568; 222/107; 401/261

(58) Field of Classification Search
CPC .. A21C 15/005; B65D 75/5883; B65D 35/12; B65D 35/38
USPC ................... 222/566–570, 107, 92; 425/191; 141/96, 297, 338, 332
See application file for complete search history.

(56) References Cited

U.S. PATENT DOCUMENTS

| | | | | |
|---|---|---|---|---|
| 2,320,496 A | * | 6/1943 | Wechsler | 425/461 |
| 3,801,247 A | * | 4/1974 | Parrish et al. | 425/191 |
| 4,600,125 A | * | 7/1986 | Maynard, Jr. | 222/81 |
| 4,844,917 A | * | 7/1989 | DeLorimiere | 426/87 |
| 5,263,607 A | * | 11/1993 | Temesvary et al. | 221/304 |
| 6,308,747 B1 | * | 10/2001 | Farris | 141/25 |
| 6,488,178 B1 | * | 12/2002 | Chun | 222/105 |
| 2004/0124210 A1 | * | 7/2004 | Bartlein | 222/92 |
| 2004/0155045 A1 | * | 8/2004 | Wild et al. | 220/703 |

FOREIGN PATENT DOCUMENTS

| | | |
|---|---|---|
| DE | 8702580 | 5/1987 |
| EP | 0757006 | 2/1997 |
| WO | WO2004/049816 | 6/2004 |

* cited by examiner

*Primary Examiner* — Paul R Durand
*Assistant Examiner* — Charles P Cheyney
(74) *Attorney, Agent, or Firm* — DeLio, Peterson & Curcio, LLC; Peter W. Peterson

(57) ABSTRACT

A two part nozzle for use in expressing thick, viscous materials therethrough comprises a nozzle base and a nozzle tip, and screw means for mounting the tip to the base. The base projects within the tip, and is proportioned to interfere with the inside wall of the tip around a narrow, continuous path, thereby providing an internal seal with the interior wall surface of a pouch to which the nozzle is coupled to prevent the back-flow of material through the screw means. Preferably, the nozzle also provides a seal on the external wall surface of the pouch, thereby reducing the possibility of material leaking both from and into the pouch. Gripping ribs are provided to facilitate the application of a manual force to couple and decouple the nozzle parts.

16 Claims, 3 Drawing Sheets

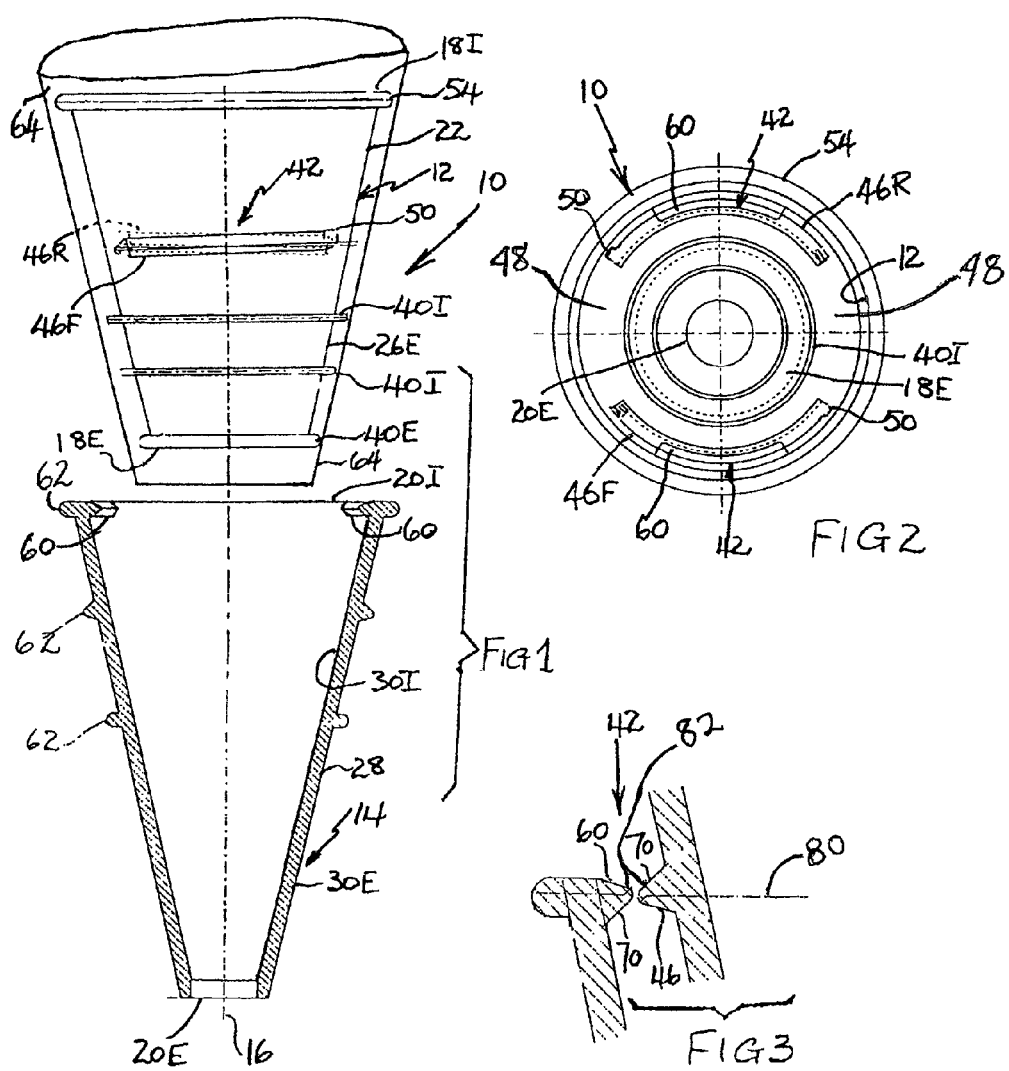

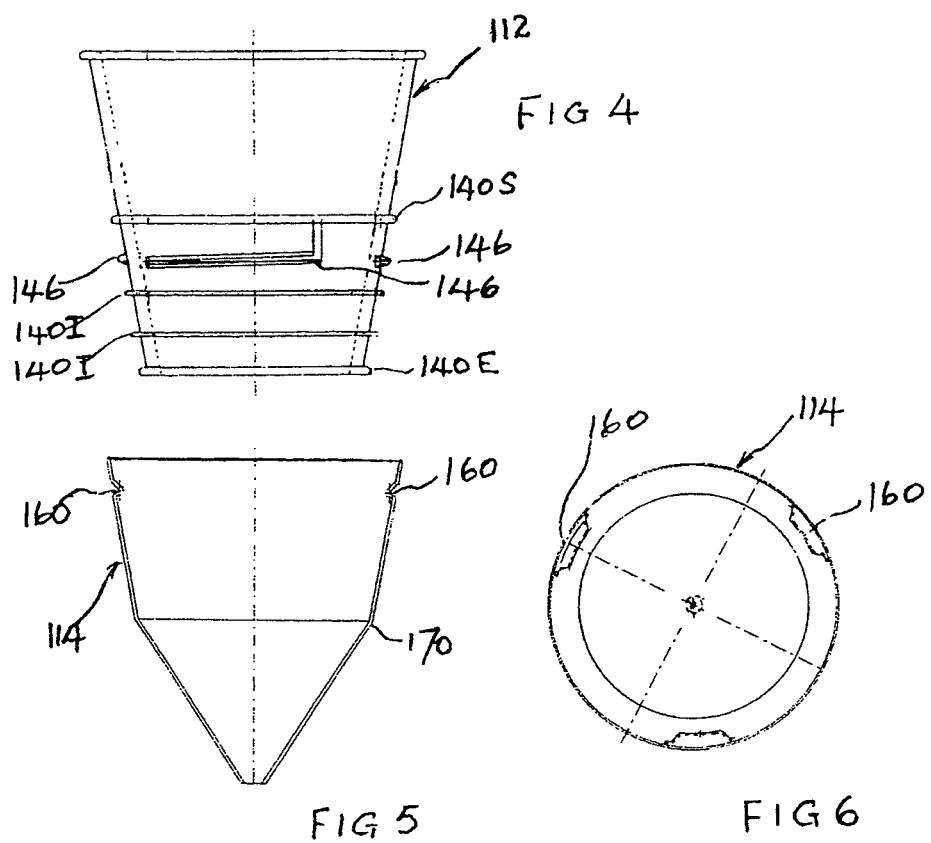

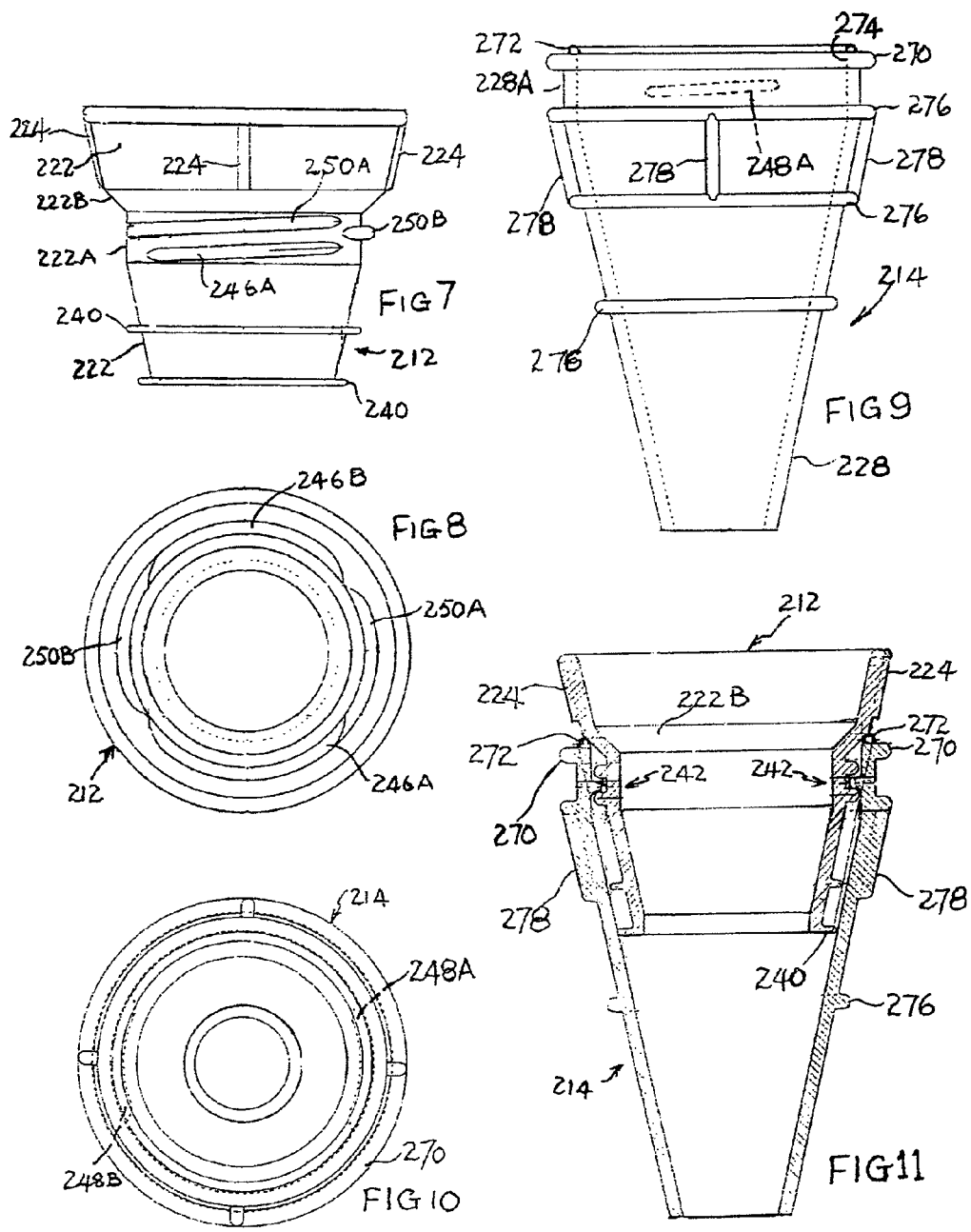

US 8,870,040 B2

TWO PART NOZZLE AND PIPING BAGS THEREFROM

FIELD OF INVENTION

This invention relates to nozzles such as may be used to form devices commonly referred to as piping bags, pastry bags or icing bags. Such bags are generally filled with a thick, flowable material such as icing, pureed fruit or vegetable, or mayonnaise, which is expressed from the bag through a nozzle, usually to achieve a decorative effect. The invention is particularly described as it relates to disposable piping bags and reusable nozzles therefor, but it will be understood that it is not limited thereto.

BACKGROUND OF INVENTION

Refillable piping bags of the prior art typically include a pouch having an open upper end defining a fill opening, and an open lower end of smaller transverse cross sectional dimension than that of the upper end, defining an outlet end. Typically, the pouch wall is constructed from a durable, impervious fabric that is permanently bonded to a nozzle base at the outlet end, to which base may be selectively connected a nozzle tip of desired cross-sectional shape to provide a pre-determined decorative effect. Improvements relating to such bags are described in the following patent documents:

| Patents | |
|---|---|
| U.S. Pat. No. 5,931,346 Wallays | U.S. Pat. No. 5,026,194 Lewis |
| U.S. Pat. No. 4,961,517 Tkac | U.S. Pat. No. 4,844,917 DeLorimiere |
| U.S. Pat. No. 4,776,488 Gurzan | U.S. Pat. No. 4,205,765 May |
| Applications | U.S. Pat. No. 6,179,165B1 Knight et al |
| | EP A 0757006 (Ooms) |
| | GB A 2237224 (Craig) |
| | EP A 02 790 663.5 (Folkmar) |

It is well established that fabric piping bags are often contaminated with pathogens even after cleansing in a manner to which they would be commonly subject in a domestic or small scale commercial facility.

It is known to provide disposable piping bags in the form of kits. Such kits will normally comprise several plastic pouches, usually distributed in a flat configuration, and one or more nozzles each having a different outlet shape to provide different aesthetic effects, which nozzles are intended to be recovered after use so as to be usable with another pouch. The pouches are shaped such that when filled they will assume a conical configuration, at least at the outlet end thereof. The nozzles of early forms of such kits were of one part and included a tubular body with a conical portion intended to be received within the conical outlet end of a pouch in tightly wedged relation, so as to create a fluid-tight seal therebetween. However, reactive forces between the stretched end of the pouch and the conical body portion of the nozzle tended to urge the nozzle from its wedged relation, and thereby break the seal. Various proposals have been made to increase the gripping inter-action between the nozzle and the pouch, without significant success. The problem is particularly acute when a preferred material, stainless steel, is used in the construction of the nozzle, due to the low coefficient of friction between this material and most plastic materials from which the pouch may typically be formed.

Much of the thrust of the prior art relating to two-part nozzles has been directed towards creating and retaining a seal between the nozzle base and a disposable pouch with which the nozzle is used. The seals described have been either purely frictional, wherein the nozzle is wedged in position in the restricted neck portion of the pouch, or possibly supplemented by welding of some type. The retention means has been separate from the seating means, and generally comprises complementary screw thread or bayonet elements disposed on the nozzle tip and the nozzle base which coact to hold the tip onto the base and simultaneously to trap the material of the pouch therebetween.

The Ooms patent document describes disposable piping bags using a two-part nozzle comprising a nozzle base and a nozzle tip, wherein the nozzle base is physically joined to the pouch by spot welds. Each of the nozzle parts includes complementary, nesting, conical wall portions with complementary coupling means disposed thereon, with a single start screw thread and a dual start, rectilinear bayonet arrangement being particularly exemplified. The coupling means serves to trap material of the pouch therebetween, and in addition to permit the facile change of nozzle tips when the piping bag is filled. The arrangement is obviously unsuited for assembly from a kit form supplied with separate pouches and nozzles, at least in a domestic environment, and is not intended to permit the recovery of the nozzle base for re-use.

Folkmar (of common inventorship herewith) describes disposable piping bags using a two-part nozzle including a base and a tip, wherein the base is structured to enhance the retention of the base in its wedged relation within the pouch. The tip is joined to the base by cooperating thread means disposed on right circular tubular portions of the nozzle, the thread means also serving to trap material of the pouch so as to assist in retaining the nozzle base in position, as well as to assist in providing a seal between the pouch and the nozzle.

It often arises that it is necessary to apply a considerable pressure to express a medium from a piping bag. This may give rise to the escape of small quantities from the nozzle by a back flow action along a passage between the interior wall of the nozzle tip and the exterior wall of the pouch. At best, this may simply be a nuisance in that the escaping medium will coat the hands of an operator, but it may have more far reaching consequences in permitting the ingress of contaminants into this passage from above the nozzle, and so risking contamination of the medium contained within the pouch. It will be evident from the foregoing that the above mentioned back-flow is susceptible to being prevented by the provision of a seal at any place along the passage. In the Folkmar patent document referenced above, there is illustrated a nozzle tip which is threadably attached to a nozzle base wherein the upper edge of the nozzle tip bears on a shoulder disposed on the base, to sandwich the pouch therebetween. This sandwiching action was described primarily as an adjunct means for securing the pouch to the nozzle base, without consideration of any sealing function to prevent the back-flow of medium from the piping bag, nor was there any consideration of the necessity or desirability of providing such sealing function, and in all events, the arrangement was not satisfactory for providing a back-flow seal.

In a two part nozzle, difficulty in separating the nozzle tip from a piping bag may be experienced where, for example the contents contained in the piping bag is of a type which sets up, such as icing sugar. Accordingly, a relatively high torque force may be required to be applied to separate the parts. Moreover, where the two part nozzle is being used to form a piping bag using a disposable film pouch, as will usually be the case, it may be desirable to apply a relatively high torque force to generate an adequate seal between the nozzle and the pouch.

It is a primary object of this invention to provide a two-part nozzle for piping applications having means for creating an effective seal to resist back-flow.

It is a further object of this invention to provide two-part nozzles with means for creating an effective back-flow seal which may be of use where a piping bag is formed using a disposable pouch or otherwise.

It is a still further object of this invention to provide two part nozzles for use with disposable pouches with improved coupling means. It is another object of this invention to provide an improved kit of parts incorporating a disposable pouch and the improved nozzles of this invention, which are suitable for reliable use in both commercial and domestic environments.

It is yet another object of this invention to provide a two part nozzle with improved gripping means for applying enhanced coupling or decoupling forces to the nozzle.

It is another object of this invention to provide a two part nozzle for the formation of piping bags using disposable film pouches wherein there is provided multiple seals between the nozzle and both the internal and the external wall surface of the pouch so as to improve the attachment of the pouch to the nozzle and reduce leakage.

It is still another object of this invention to provide nozzles and kits of parts for forming piping bags for use in commercial and domestic environments wherein the nozzles may be economically manufactured and which are easily recovered intact for re-use.

SUMMARY OF THE INVENTION

In accordance with a prime aspect of the invention, a two part nozzle for dispensing thick, viscous fluids therethrough comprises a nozzle tip having an inlet opening, an outlet opening, and a right circular, axially elongated tubular wall extending therebetween defined in part by an internally facing wall surface of the nozzle tip and an externally facing wall surface, at least a portion of the internally facing wall surface intermediate the inlet and outlet openings being conically inclined towards the outlet opening thereof. The nozzle further comprises a nozzle base having an inlet opening, an outlet opening, and a right circular, axially elongated tubular wall extending therebetween, defined in part by an externally facing wall surface. The nozzle base is nestable within the nozzle tip with externally facing portions of the tubular wall of the nozzle base in opposed relationship to internally facing portions of the tubular wall of the nozzle tip. Screw means suitably in the form of a ramped bayonet coupling are provided comprising mateable thread elements respectively disposed on the tubular wall of the base and of the nozzle tip. The screw means are initially engageable to hold the nozzle tip onto the nozzle base and are actuatable to draw the tip onto the base with a partial rotation of the nozzle tip with respect to the nozzle base. Suitably and preferably, the screw means are disposed on the opposed conically inclined wall surface portions of the tubular wall. The nozzle is characterized wherein when the mateable thread elements are initially engaged the opposed portions of the tubular wall surfaces are held in marginally spaced apart relationship, and wherein the externally facing wall surface of the tubular wall of the base is adapted and configured whereby as the screw means is actuated to draw the nozzle tip onto the nozzle base, at least one portion of the exterior facing wall surface of the nozzle base of limited axial extent which is disposed intermediate the screw means and the outlet opening to the nozzle base is urged along an intersecting path towards the conically inclined portion of the internally facing wall surface of the nozzle tip over a narrow, endless band, and act to form an internal seal.

Accordingly, where the nozzle base is used in conjunction with a disposable pouch, the pouch will be firmly sandwiched in the interior of the nozzle tip along a narrow band circumscribing the confronting wall surfaces, to create an internal seal, thereby precluding the escape of material from the interior of the nozzle tip through the inlet opening of the tip, and conversely, the passage of any contaminants into the body of the nozzle tip on the outside of the nozzle base. Given that the pouch will be urged onto the nozzle base, the internal seal will also act both to seal the pouch onto the nozzle base and also to secure the pouch to the nozzle base to preclude their accidental separation. Where, for example the two part nozzle of the invention is used wherein a pouch is unitary with the nozzle base, the narrow sealing band disposed on the nozzle base will bear directly upon the inner wall of the nozzle tip, and thereby create a back-flow seal.

Suitably and preferably, the nozzle base is adapted to forming the internal seal by forming a narrow shoulder circumscribing the externally facing wall surface of the nozzle base adjacent the outlet opening thereof, which shoulder will bear upon the conically inclined portion of the interior facing wall of the nozzle tip when the screw means is actuated.

In accordance with a preferred embodiment, the conically inclined portion forms a part of the interior facing surface of the tubular wall of the nozzle tip which may extend generally over all or substantially all of its axial length. The exterior facing wall surface of the nozzle base is also conically inclined at a similar angle over all or much of its axial length, and a pair of narrow, axially spaced apart shoulders are provided circumscribing the exterior facing wall of the nozzle tip, so forming two internal seals.

Suitably, the nozzle base is provided with a shoulder circumscribing the exterior facing wall thereof superior to the screw means, against which a wall portion of the tip disposed above the screw means may bear when the screw means is actuated, so forming an external seal.

A further aspect of the invention comprises the provision of gripping means disposed on the exterior wall surface of at least the nozzle tip, and suitably and preferably, both the nozzle tip and the nozzle base. In accordance with a preferred embodiment, the gripping means comprises a plurality of radially spaced apart, generally axially aligned ribs upstanding from the nozzle tip and the nozzle base. The improved gripping means permits the manual generation of a relatively high coupling torque, whereby it is desirable to provide one or more hoop ribs to reinforce the nozzle tip.

In accordance with another aspect of the invention, the thread elements employed in the ramped bayonet coupling arrangements may be provided with profiles which serve to enhance the translation of the radial action of the bayonet to an axial movement of the coupled parts.

The invention still further relates to kits and piping bags assembled therefrom using the improved nozzles of the invention.

BRIEF DESCRIPTION OF THE DRAWINGS

FIG. 1 shows in exploded, partially assembled view the component parts of a piping bag in accordance with the invention, with the nozzle tip shown in cross-section and the nozzle base in side elevation, positioned within the lower end of a cut-away pouch;

FIG. 2 shows in plan view from above the nozzle base of FIG. 1 nested within the nozzle tip thereof, wherein the nozzle tip is rotated about 90° from its position as seen in FIG. 1;

FIG. 3 shows in sectional view on enlarged scale, a fragmentary detail of the coupling means used in the embodiment of FIG. 1;

FIG. 4 shows in elevation a second embodiment of a nozzle base;

FIG. 5 shows in elevation a nozzle tip for use with the nozzle base of FIG. 4;

FIG. 6 shows in plan view from above the nozzle tip of FIG. 5;

FIG. 7 shows in side elevation a third embodiment of a nozzle base in accordance with the invention;

FIG. 8 shows the nozzle base of FIG. 7 in plan view from below;

FIG. 9 shows a nozzle tip for use with the nozzle base of FIG. 7 in side elevation, with hidden interior detail shown in dashed outline;

FIG. 10 shows the nozzle tip of FIG. 9 in plan view from below; and

FIG. 11 shows the nozzle base and nozzle tip of FIGS. 7 and 9 in coupled relationship, rotated through 90° about its central axis in relation to FIGS. 7 and 9, shown in axial cross section.

DESCRIPTION OF THE PREFERRED EMBODIMENTS

Referring to the drawings in detail, a two part nozzle in accordance with a first embodiment of the invention is seen in FIGS. 1-3 wherein it is identified by the numeral 10. Nozzle 10 comprises a nozzle base 12 and a nozzle tip 14, which parts may be referred to hereinafter for the sake of brevity as base 12 and tip 14. Base 12 and tip 14 are each in the form of a tubular, right circular truncated cone, and other than as may be specifically referred to or may otherwise be clear from the ensuing description, suitably have a two-fold rotational plane of symmetry containing a notional axis 16. Base 12 has an inlet opening 18I and an outlet opening 18E, and similarly tip 12 has an inlet opening 20I and an exit opening 20E. Base 12 is defined in part by a conical wall 22 having an externally facing wall surface 26E, and tip 14 is similarly defined by conical wall 28 with an internally facing wall surface 30I and an externally facing wall surface 30E.

Conical walls 22 and 28 are inclined at a similar conical angle whereby base 12 and tip 14 are nestable over a portion of their axial lengths, so forming mutually confronting surface portions of wall surfaces 26E and 30I. An annular shoulder 40E is disposed on a confronting surface portion of wall surface 26E adjacent to the exit 18E of base 12, to project marginally radially outwardly from wall surface 26E. A further similar shoulder 40I is disposed on this confronting surface portion 26E in axially spaced apart relation to shoulder 40E. Each of shoulders 40E, 40I extends about surface 26E in a closed, right circular loop. Conveniently and preferably, shoulders 40E and 40I are integrally and unitarily formed with base 12, as by molding for example.

Also disposed on the confronting surface 26E of base 12 to project radially outwardly therefrom is a first portion of a coupling means 42 for coupling base 12 to tip 14. This first portion of the coupling means 42 comprises a thread element 46 which consists of two similar parts identified as a forward part 46F and diametrically opposed thereto, a rearward part 46R. It may be noted here that the words "forward" and "rearward" and the like are relative, and are used to facilitate the description of the embodiment, and are not to be construed in any absolute sense unless the context clearly indicates to the contrary. Conveniently, each of the thread elements 46F and 46R extend over an angular interval of about 115°, so as to be peripherally spaced apart by an interval of about 65° to provide notches 48 therebetween. Thread element 46 is helical, and pitched at a small angle, conveniently about 1.5°; the uppermost end of each portion 46F, 46R is provided with a dislocation forming a stop 50. Still further disposed on wall surface 26E to project radially outwardly therefrom adjacent inlet opening 18I is an annular rib member 54 similar in nature to compression ring 40E, but which serves a different purpose as will be subsequently described. Nozzle tip 14 is provided with a second portion of coupling means 42 for coupling tip 14 to base 12; this second portion comprises a pair of diametrically opposed flanges 60 disposed on wall surface 30I to project radially inwardly therefrom adjacent inlet opening 20I. Flanges 60 each extend peripherally over an angular interval of somewhat less than the angular interval over which notches 48 extend, conveniently in this instance about 60°. One or more reinforcing ribs 62 are optionally disposed at judiciously spaced apart intervals on the external surface 30E of tip 14.

Considering now the manner in which nozzle 10 as thus far described is used to form a piping bag, nozzle base 12 is first inserted into the interior of a disposable pouch 64 through the open, upper end thereof (not shown) so as to wedge at least moderately tightly into the lower end thereof. It will be appreciated that rib member 54, thread element 46 and shoulders 40E, 40I all promote and facilitate the wedging of base 12 within the lower end of pouch 64. Tip 14 is then engaged axially with base 12, and adjusted so as to permit the entry of flanges 60 between notches 48, thereby permitting the engagement of coupling means 42. In this initial position of engagement, confronting wall surfaces of nozzle base 12 and nozzle tip 14 will be marginally spaced apart so as to permit the passage of the material forming pouch 64 therebetween. Tip 14 is then rotated in a clockwise direction in the embodiment illustrated, causing flanges 60 to ride along thread elements 46, and thus urge the confronting walls 26E and 30I into proximity. Accordingly, the film wall of disposable pouch 64 will be trapped in a fluid tight relationship between ribs 40E, 40I and the inner surface 30I of tip 14 in a fluid tight relationship to form an internal seal, which will still further serve to physically secure pouch 64 to nozzle base 12. Nozzle 10 may easily be recovered for subsequent re-use merely by reversing the steps described above for assembling the nozzle.

Considering now the particular profile of the elements forming coupling means 42, the mating surfaces 70 of thread elements 46 and flanges 60 are formed at a complementary acute angle to a notional horizontal line 80 passing through the ridge 82 on each of flanges 60 and thread elements 46. As tip 14 is rotated in a sense to draw the tip onto nozzle base 12, this will cause one mating surface 70 to ride up onto the opposed mating surface, thereby permitting a greater area of contact between an essentially flat flange and a helically inclined thread element 46.

It will be understood from the foregoing description that the coupling means 42 formed by thread elements 46 and flanges 60 form in essence a simple two-start split thread. In the embodiment illustrated in FIGS. 4-6, a simple three-start split thread arrangement is used to couple a base 112 and tip 114. Base 112 has shoulders 140E, 140I and 140S and thread element 146. This arrangement is particularly suited where tip 114 is formed from thin walled metal, with stainless steel being particularly suited and preferred for food handling items. In this instance, ribs 160 are formed as upsets in the wall of tip 114, which changes angle at 170.

In a third embodiment, as illustrated in FIGS. 7-11, which is particularly suited to somewhat larger piping bags, a two part nozzle comprises a nozzle base 212 and a nozzle tip 214, each having a two-fold axial plane of symmetry. Nozzle base 212 in upper and lower portions thereof has a tubular conical form comprising wall 222, and in this respect is similar to nozzle base 12 of the first embodiment. However, intermediate portions initially have a constant radial dimension referenced as 222A, and this then flares outwardly at a somewhat greater conical angle than that of contiguous portions to form a small shoulder 222B. Wall 222 above shoulder 222b is provided with a plurality of radially spaced apart, generally axially aligned ribs 224 upstanding thereon. Small, axially spaced apart shoulders 240 radiate from wall 222 adjacent the lower end thereof. Nozzle tip 214 in lower wall portions 228 thereof is also conically tubular, inclined similarly to wall 222, while upper portions have a constant radial dimension 228A and terminate in an outwardly projecting rim 270. A small, upwardly projecting rib 272 circumscribes rim 270 adjacent the inlet opening 274 of nozzle tip 214. A plurality of axially spaced apart ribs 276 are upstanding from wall 228 in circumscribing relation thereto, while a plurality of generally axially aligned, radially spaced apart ribs 278 of limited axial length extend along the wall. Disposed on confronting portions 222A and 228A of nozzle base 212 and nozzle tip 214 respectively is a split two-start screw coupling means 242 for coupling the tip to the base. Coupling means 242 comprises two diametrically opposed thread elements 246A, 246B disposed on nozzle base 212 and two complementary thread elements 248A, 248B disposed on nozzle tip 214. Thread elements 246A, 246B, 248A, 248B are each of limited peripheral extent, whereby they may be initially moved into a meshing position in an axial direction in analogous manner to coupling means 42 of the first embodiment Subsequent radial movement of nozzle tip 214 will then serve to urge the nozzle tip 214 onto nozzle base 212. Coupling means 242 still further comprises a counter-thread element 250A, 250B associated with respective thread elements 246A, 246B and disposed thereabove in spaced apart relationship sufficient to permit the passage of thread elements 248A, 248B therebetween.

Considering now the operation of this third embodiment, this will initially be analogous to that of the first embodiment, which is to say that nozzle base 212 will be inserted into a disposable pouch (not shown) and wedged in the conical outlet end thereof, following which the nozzle tip 214 will be engaged axially with the nozzle base, then rotated in a sense to urge the tip onto the base. The dimensions of the nozzle base 212 and nozzle tip 214 are such that as shoulders 240 move to a position proximate conical wall 228 whereby they will ultimately coact to provide an internal seal with the wall of the disposable pouch, rib 272 disposed on rim 270 will move to a position proximate shoulder 222B, where it will ultimately coact therewith to provide an external seal on the pouch wall. Axial ribs 224 on nozzle base 212 and axial ribs 278 on nozzle tip 214 will facilitate an enhanced manual gripping pressure to be applied to the nozzle parts, and in turn this will permit an enhanced coupling torque to be applied and thereby reduce the possibility of leakage from a piping bag when the nozzle is coupled thereto. Hoop ribs 276 will serve to restrain possible deformation that might be caused by the wedging action of nozzle base 212 within nozzle tip 214 as these parts are coupled together. It will be understood that gripping ribs 272, 278 will also facilitate the decoupling of nozzle tip 212 from nozzle base 214. When it is desired to uncouple tip 214 from nozzle base 212, counter- rotation of the tip will cause thread elements 248A, 248B to bear on counter-threads 250A, 250B and thereby tend to break any seal that may have been formed over time between the elements forming coupling means 242. It will be appreciated that while this embodiment has been described in terms of its use with a disposable pouch, it is equally contemplated that nozzle base 212 could be integrally formed with a container within which viscous material could be contained, in which event shoulders 240 will provide an internal seal directly on wall 228, with an external seal formed by direct contact between rib 272 and shoulder 222B.

The invention claimed is:
1. A piping bag comprising in combination a two part nozzle
and a pouch formed from a flexible material having a dispensing opening defined by conically inclined walls for dispensing thick, viscous fluids therethrough comprising, in combination;
a nozzle tip having an inlet opening, an outlet opening, and a right circular, axially elongated tubular wall extending therebetween defined in part by an internally facing wall surface and an externally facing wall surface, and;
a nozzle base having an inlet opening, an outlet opening, and a right circular axially elongated tubular wall extending therebetween, defined in part by an externally facing wall surface; said nozzle base further having a shoulder extending around an externally facing portion of the base tubular wall and spaced from the nozzle base outlet opening; said nozzle base being nestable within said nozzle tip with externally facing portions of said tubular wall of said nozzle base in opposed, mutually confronting relationship with internally facing portions of said tubular wall of said nozzle tip;
screw means comprising mateable thread elements respectively disposed on said tubular wall of said base between the base inlet and outlet openings and on said tubular wall of said nozzle tip between the tip inlet and outlet openings, the screw means being initially engageable to hold said nozzle tip onto said nozzle base with said confronting portions in marginally spaced apart relationship and actuatable to draw said tip onto said base;
wherein, upon actuation of said screw means, internally facing portions disposed within a hollow interior of said nozzle tip intermediate said screw means and said nozzle tip outlet opening and externally facing portions intermediate said screw means and said nozzle base outlet opening are shaped in a manner so as to move to an intersecting relationship around an annular path of narrow axial extent to trap a wall of said pouch therebetween and form a seal, and
wherein said nozzle base is disposed on the interior of the conically inclined walls of said dispensing opening and said nozzle tip is disposed on the exterior thereof with said conically inclined walls of the flexible material projecting into the interior of said tip intermediate said outlet opening of said base and said outlet opening of said tip, characterized wherein the conically inclined walls of the projecting film material are sandwiched between the externally facing portions intermediate said screw means and said nozzle base outlet opening and the internally facing portions intermediate said screw means and said nozzle tip outlet opening to form an internal seal therewith, and wherein the shoulder of said nozzle base and the wall of said nozzle tip provide a narrow sealing band for the conically inclined walls of the projecting film material disposed intermediate said screw means and said outlet opening of said nozzle base.

2. A piping bag as defined in claim 1 characterized wherein said confronting surface portions are shaped by being conically inclined at a similar angle, and by forming a narrow shoulder to circumscribe said externally facing wall surface of said nozzle base adjacent said outlet opening thereof.

3. A piping bag as defined in claim 2 characterized wherein there is formed a second narrow shoulder to circumscribe said externally facing wall surface of said nozzle base located intermediate said first shoulder and said screw means.

4. A piping bag as defined in claim 1 wherein said screw means comprises a ramped bayonet coupler having split thread elements whereby the tip may be moved axially over the base to engage the thread elements on the tip and base and subsequently rotated to draw the tip into the base and actuate the screw means to trap the wall of the pouch therebetween and form the seal.

5. A piping bag as defined in claim 4 characterized wherein said ramped bayonet coupler is disposed on said confronting surface portions of said tubular wall.

6. A piping bag as defined in claim 1 characterized wherein a plurality of outwardly facing radially spaced apart, axially aligned ribs are disposed on at least said nozzle tip to facilitate the manual gripping thereof.

7. A piping bag as defined in claim 6 characterized wherein said outwardly facing ribs are disposed on said nozzle base.

8. A piping bag as defined in claim 7 characterized wherein a plurality of axially spaced apart reinforcing ribs circumscribe said nozzle tip.

9. A piping bag as defined in claim 1 characterized wherein said nozzle base is unitarily moulded in a resin material.

10. A kit of parts for forming a disposable piping bag comprising, in combination, at least one disposable pouch and a two-part nozzle as defined in claim 1.

11. A piping bag as defined in claim 1 wherein the pouch is formed from a flexible, plastic film material.

12. A piping bag as defined in claim 1 characterized wherein said flexible material is further sandwiched between said nozzle base and said nozzle tip to provide an external seal therewith.

13. A piping bag as defined in claim 2 characterized wherein said screw means comprises a ramped bayonet coupler.

14. A piping bag as defined in claim 11 characterized wherein said screw means comprises a ramped bayonet coupler having split thread elements whereby the tip may be moved axially over the base to engage the thread elements on the tip and base and subsequently rotated to draw the tip into the base and actuate the screw means to trap the wall of the pouch therebetween and form the seal.

15. A piping bag as defined in claim 13 characterized wherein said ramped bayonet coupler is disposed on said confronting surface portions of said tubular wall.

16. A piping bag as defined in claim 14 characterized wherein said ramped bayonet coupler is disposed on said confronting surface portions of said tubular wall.

\* \* \* \* \*